United States Patent
Matsui et al.

(10) Patent No.: US 6,975,283 B2
(45) Date of Patent: Dec. 13, 2005

(54) INFORMATION COMMUNICATION SYSTEM

(75) Inventors: Toshio Matsui, Higashihiroshima (JP); Tsuyoshi Yamaguchi, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 10/239,406

(22) PCT Filed: Mar. 21, 2001

(86) PCT No.: PCT/JP01/02231

§ 371 (c)(1),
(2), (4) Date: Sep. 23, 2002

(87) PCT Pub. No.: WO01/71509

PCT Pub. Date: Sep. 27, 2001

(65) Prior Publication Data

US 2003/0105869 A1 Jun. 5, 2003

(30) Foreign Application Priority Data

Mar. 23, 2000 (JP) .......................... 2000-82481

(51) Int. Cl.⁷ ............................................... G09G 5/00
(52) U.S. Cl. ..................................................... 345/2.1
(58) Field of Search ...................... 345/2.1, 732, 764, 345/781, 810, 835, 841, 778; 455/457, 427, 552, 566, 557, 432, 456.5, 414.3; 705/1, 21; 709/217; 707/217, 10, 3; 725/110; 369/29, 29.01; 382/100

(56) References Cited

U.S. PATENT DOCUMENTS

| | | | | |
|---|---|---|---|---|
| 4,969,136 A | * | 11/1990 | Chamberlin et al. | 369/29.01 |
| 5,884,271 A | * | 3/1999 | Pitroda | 705/1 |
| 6,091,956 A | * | 7/2000 | Hollenberg | 455/456.5 |
| 6,311,165 B1 | * | 10/2001 | Coutts et al. | 705/21 |
| 6,389,422 B1 | * | 5/2002 | Doi et al. | 707/10 |
| 6,411,725 B1 | * | 6/2002 | Rhoads | 382/100 |
| 6,600,930 B1 | * | 7/2003 | Sakurai et al. | 455/414.3 |
| 6,621,508 B1 | * | 9/2003 | Shiraishi et al. | 345/810 |
| 6,813,503 B1 | * | 11/2004 | Zillikens et al. | 455/457 |
| 2001/0039571 A1 | * | 11/2001 | Atkinson | 709/217 |
| 2002/0036652 A1 | * | 3/2002 | Masumoto et al. | 345/732 |
| 2002/0036694 A1 | * | 3/2002 | Merril | 348/220 |
| 2002/0183059 A1 | * | 12/2002 | Noreen et al. | 455/427 |
| 2003/0074672 A1 | * | 4/2003 | Daniels | 725/110 |

FOREIGN PATENT DOCUMENTS

| | | |
|---|---|---|
| JP | 11-145955 A | 5/1999 |
| JP | 11-146076 A | 5/1999 |
| JP | 2000-30366 A | 1/2000 |
| KR | 2000-10009 | 2/2000 |

OTHER PUBLICATIONS

Office Action in KR 10–2002–7012518, dated Sep. 15, 2004 (and translation thereof).

* cited by examiner

Primary Examiner—Vijay Shankar
Assistant Examiner—Prabodh Dharia
(74) Attorney, Agent, or Firm—Nixon & Vanderhye, PC

(57) ABSTRACT

An example information communication system is provided in which a user has access to a data communication network through a communication device. Titles of content and summary of information on the communication network, for example, are displayed on a display screen of the communication device so that the user can check for the presence of desired data. When the user has found desired data, the user inputs instructions for downloading the data through a control portion to start the downloading of the data to an information device. When no desired data is found, the user can continue to search for desired data or disconnect from the data communication network.

20 Claims, 7 Drawing Sheets

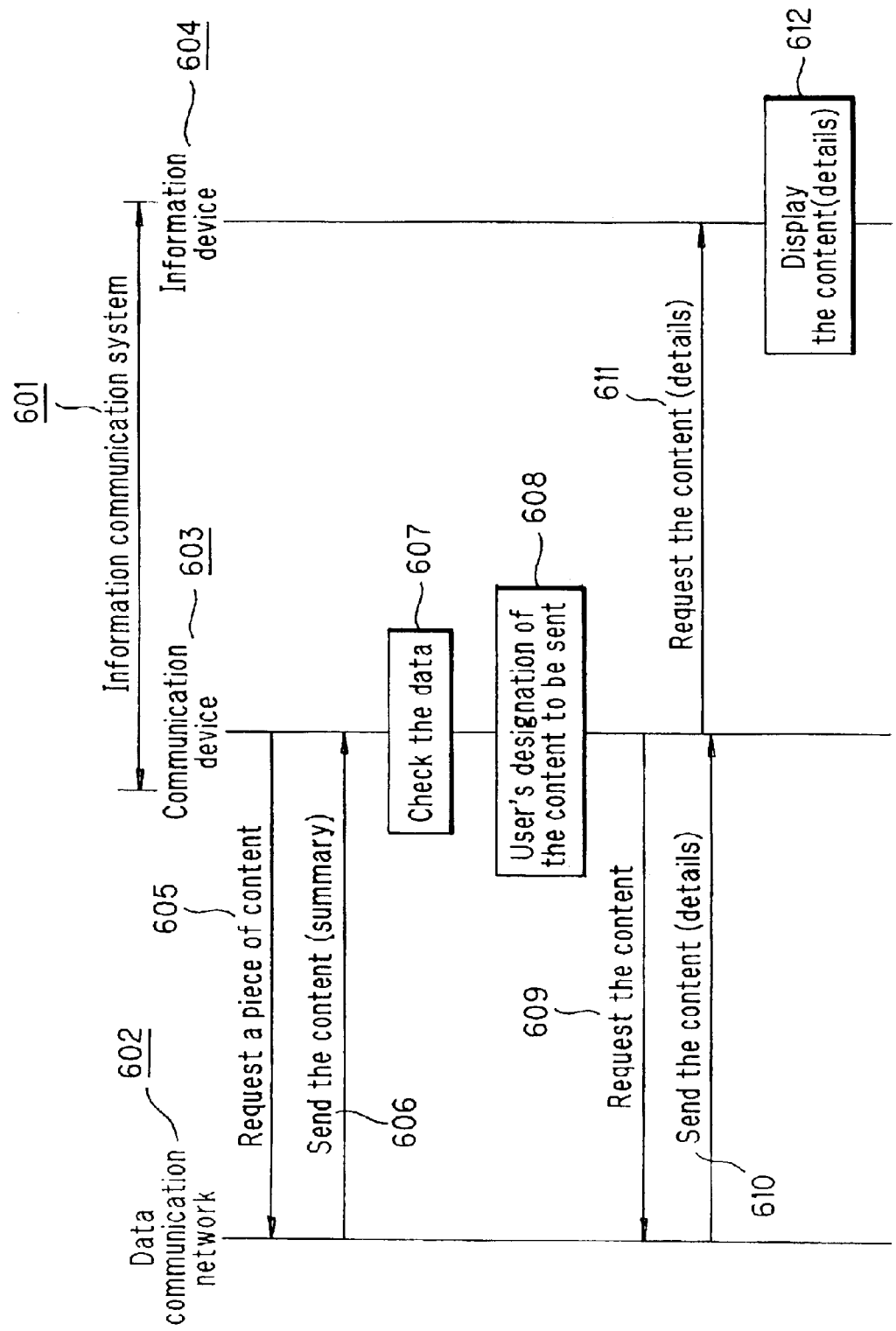

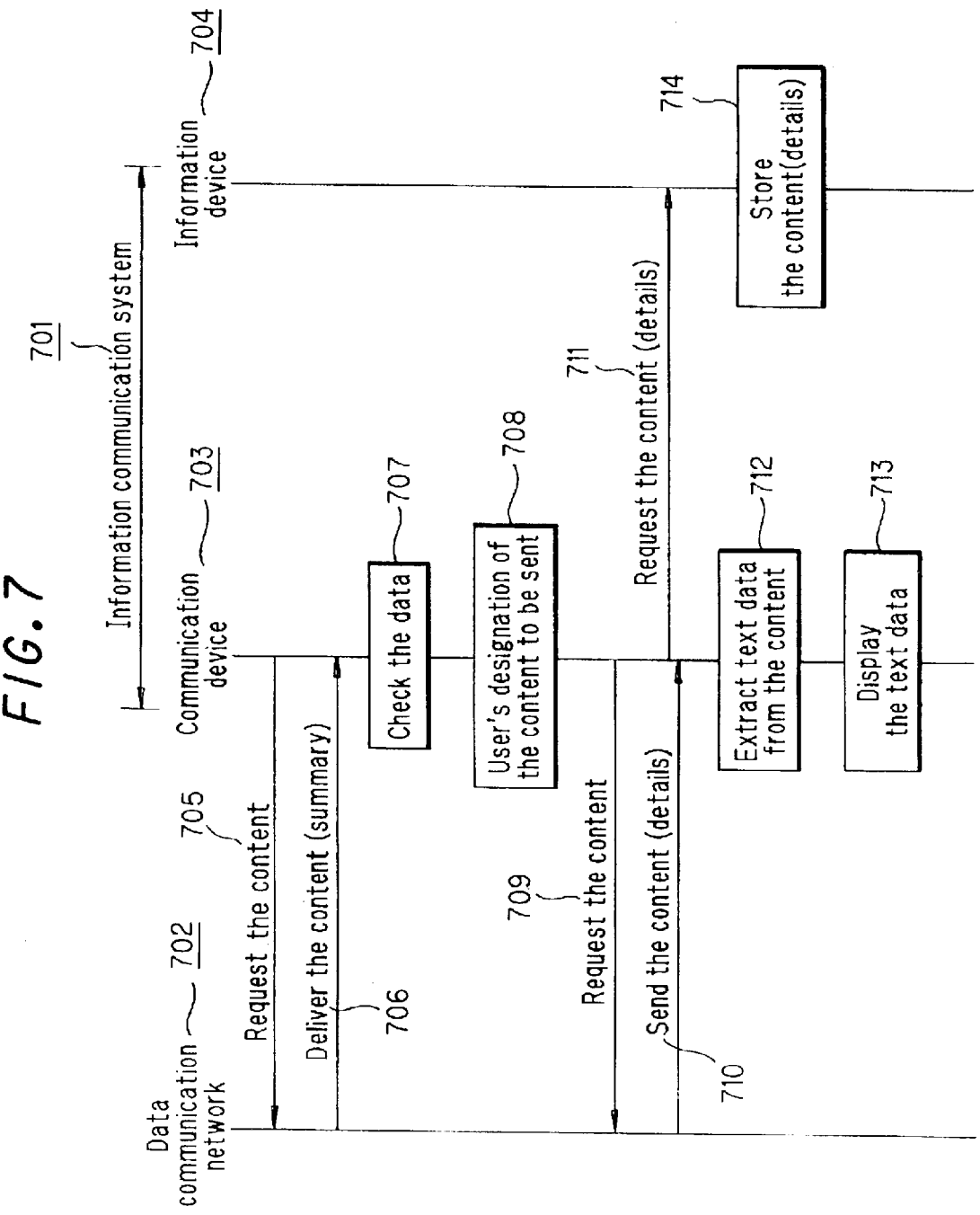

INFORMATION COMMUNICATION SYSTEM

This application is the national stage of PCT/JP01/02231, filed Mar. 21, 2001, which designates the United States.

TECHNICAL FIELD

The present invention relates to an information communication system which is connected to a communication network to allow content data to be checked and downloaded from the communication network.

BACKGROUND ART

Recently, data communication has become very popular. Not only data communication by connection of individuals from fixed terminals on networks, but also connection to the Internet from portable mobile communication terminals, such as cellular phones, via mobile communication networks, can be made so as to obtain access to information of personal interest and information on business, among other content on the Internet, whereby text information, images, email, etc., can be received easily through the mobile communication terminals, by giving instructions through the display of the mobile communication terminal.

It is also common practice for an information terminal of high volume data processing with a larger display device to be connected to a communication terminal so that access to the Internet through the communication terminal is made to obtain more detailed information or greater sized data.

Generally, contents on the Internet are displayed by content data titles, summary of information and the like, and in most cases, these being linked to their data and detailed pieces of information.

The above mobile communication terminals make easy internet access possible but need to be sized, from the demand of portability, only so large as to be held by one hand and allow for voice communication, so that the size of the information display screen is naturally limited. Further, the mobile communication terminals are low in data processing capacity compared to the aforementioned information terminals and low in storage memory capacity, hence display of information is limited to a small size of data such as text data, small images, which can be viewed through a small sized display screen and downloadable data is limited to small amounts. For these reasons, if detailed information or a large amount of data needs to be downloaded, full access should be made by using the information terminal.

Connection of a combined system of the communication terminal and the information terminal makes it possible to download more detailed information, greater images and download data of a grater size. However, the communication terminal should be connected to the information terminal every access to the Internet. Further, since designation of data to be downloaded must be made through the information terminal, just checking of summary information and the like, which do not need a large display, forces the user to take out the information terminal from their bag or the like.

In the above way, the prior art example has the problems as follows. When internet access is made from the mobile communication terminal, the access is easy but only a small amount of data can be obtained. On the other hand, access through the information terminal makes it possible to receive a large amount of information but needs time and labor for its connection.

In a conventional publication, 'Information Communication System and Information Processing Terminal Unit', disclosed in Japanese Patent Application Laid-open Hei No. 11-145955, a configuration which selectively downloads music, text data to a portable terminal device via a communication terminal, aiming mainly at being used as a karaoke on-demand system, is proposed. Therefore, the portable terminal device of this system, differing from the above information terminal, is not one that cannot afford sufficient enough display function and storage capacity for downloaded data, because of the constraint of its physical apparatus size. Further, unlike portable communication terminal or portable information terminal which is always carried by the user, it is not one that has the function of permitting selection of a terminal for storing and displaying the data based on the convenience of use. In this way, since, to download data, this device cannot select an information terminal which is most suitable for storing and/or displaying the data, in accordance with the amount of data and its content, it is impossible to deal with services which become increased in amount of data from day to day.

It is therefore an object of the present invention to provide an integrated information communication system which is constituted of two types of devices, communication device and information device, having different problems, so that connection to data networks including the Internet, reading summary of information and designation of data to be downloaded are carried out by the compact communication device while reading of detailed data and storage of the downloaded data can be performed by the information device.

DISCLOSURE OF INVENTION

In order to achieve the above object, an example embodiment of the present invention is configured as follows. The example embodiment of the present invention is an information communication system, comprising: a communication device having a communication unit for connection to a communication network, a small display screen and a control portion; an information device having a large display screen, a storage memory and a control portion; and a connecting means for enabling data exchange between the communication device and the information device, and being characterized in that the communication device enables content data and/or summary of information to be checked on the display screen when content data and/or information is downloaded via the communication network, and the data body of the content and/or detailed information of which download is wanted is downloaded to the information device utilizing the connecting means so that the data and/or the information is stored in a storage memory area of the information device and displayed on the display screen of the information device.

In the information communication system, it is preferred that the connecting means keeps electrical connection between the communication device and the information device, enables data exchange between them and enables the information device to send request information, such as content selection, to the data communication network.

In the information communication system, it is preferred that while data is downloaded to the information device, the progress status of downloading is displayed on the display screen of the communication device.

In the information communication system, it is preferred that upon user's selection of content, the size of data of the content is compared with the amount of storage memory area left in the information device, and the downloading is canceled when the amount of the storage memory area left in the information device is insufficient.

In the information communication system, it is preferred that, when downloading is canceled, the fact of cancellation of downloading is displayed on the display screen of the communication device so as to inform the user of the cancellation of downloading.

In the information communication system, it is preferred that a piece of content information is designated through the communication device, and while the content information is downloaded to the information device, the content information is displayed on the display screen of the information device at the same time as the content information is downloaded to the information device.

In the information communication system, it is preferred that, based on the information such as a tag, etc., assigned to the downloaded information, it is determined whether the information should be displayed on the display screen of the communication device or should be displayed on the display screen of the information device.

In the information communication, it is preferred that it is determined whether the received information should be displayed on the display screen of the communication device or should be displayed on the display screen of the information device based on the size of the received information.

In the information communication system, it is preferred that, when the size of information being downloaded to the information terminal exceeds a predetermined level, the information is determined to be displayed on the information device.

In the information communication system, it is preferred that a piece of content information is designated through the communication device and the downloading is requested by the communication device, and when the data is downloaded to the information device using the connecting means, only the data displayable on the display screen of the communication device, such as text data and the like, is extracted from the downloaded content information so as to be displayed on the display screen on the communication device while the whole data is downloaded to the information device and stored into the storage memory in the information device.

As described above, according to the example embodiment of the present invention, the communication device, on downloading content data and/or information via the communication network, enables the content data or summary of information to be checked on the display screen while the data body of the content and detailed information, of which download is wanted, are downloaded to the information device using the connecting means and stored into the storage memory area of the information device and displayed on the display screen of the information device. Therefore, this configuration has the advantage that communication control can be made through the compact communication device and the data can be downloaded to the large information device while it is held in a bag or container. Further, if no information of which further detail is wanted is found among the information capable of being viewed through the communication device, it is not necessary to take the trouble to take out the information device. That is, this configuration also has the advantage the information device is taken out only when it is necessary. Further, when the amount of empty storage memory of the information device is lower than the size of the content data, the download is canceled. Therefore, it is possible to avoid failure of download and waste of charge.

BRIEF DESCRIPTION OF DRAWINGS

FIG. 6 is a flowchart showing another specific processing sequence with regards to the communication device and information device when the information communication system of the present embodiment is connected to a data communication network; and FIG. 7 is a flowchart showing a further specific processing sequence with regards to the communication device and information device when the information communication system of the present embodiment is connected to a data communication network.

BEST MODE FOR CARRYING OUT THE INVENTION

Next, the embodiment of the present invention will be described with reference to the drawings.

Figure 1:
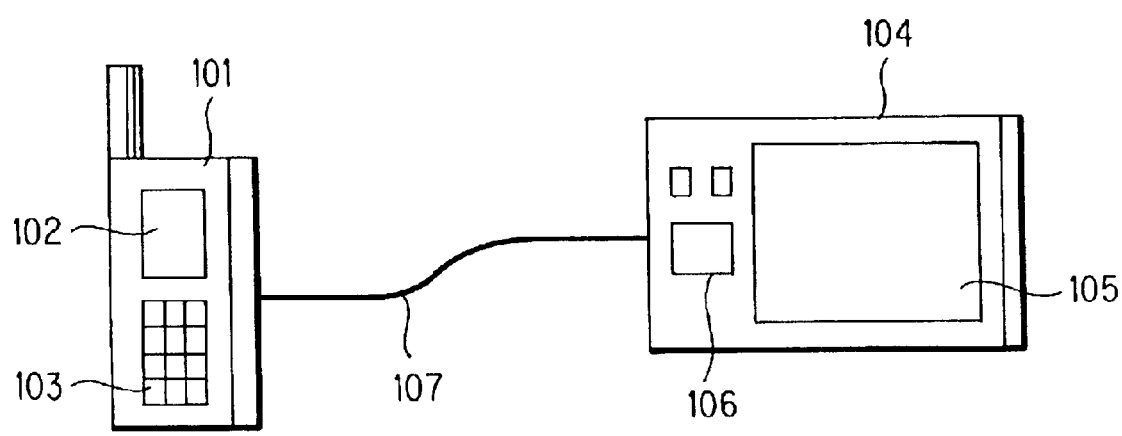
FIG. 1 is a perspective illustrative view showing an information communication system in accordance with the embodiment of the present invention.

FIG. 1 shows one embodiment of the present invention, an information communication system including a communication device 101, information device 104 and a connecting means 107. Communication device 101 includes a connecting means for connection to data communication networks such as the Internet, similarly to a compact mobile communication terminal, and connecting means 107 for connection to the information device 104, and has a small display screen 102 and a control portion 103. Information device 104 has a large display screen 105, a control portion 106 and connecting means 107 for connection to communication device 101, with no connecting function to public lines. Connecting means 107 keeps electric connection between communication device 101 and information device 104, and provides the function of sending/receiving data therebetween, the function of sending/receiving request information such as inquiries about the remaining storage memory, data download requests and the like. This connecting means 107 may be of a wireless or wire-connected configuration and may use any type connection protocol.

Communication device 101 and information device 104 are connected by connecting means 107, and reading of simple information is performed by communication portion 101 alone, while information device 104 may be used when detailed information and images, and large amounts of data need to be downloaded from a connected site or need to be displayed.

Figure 2:
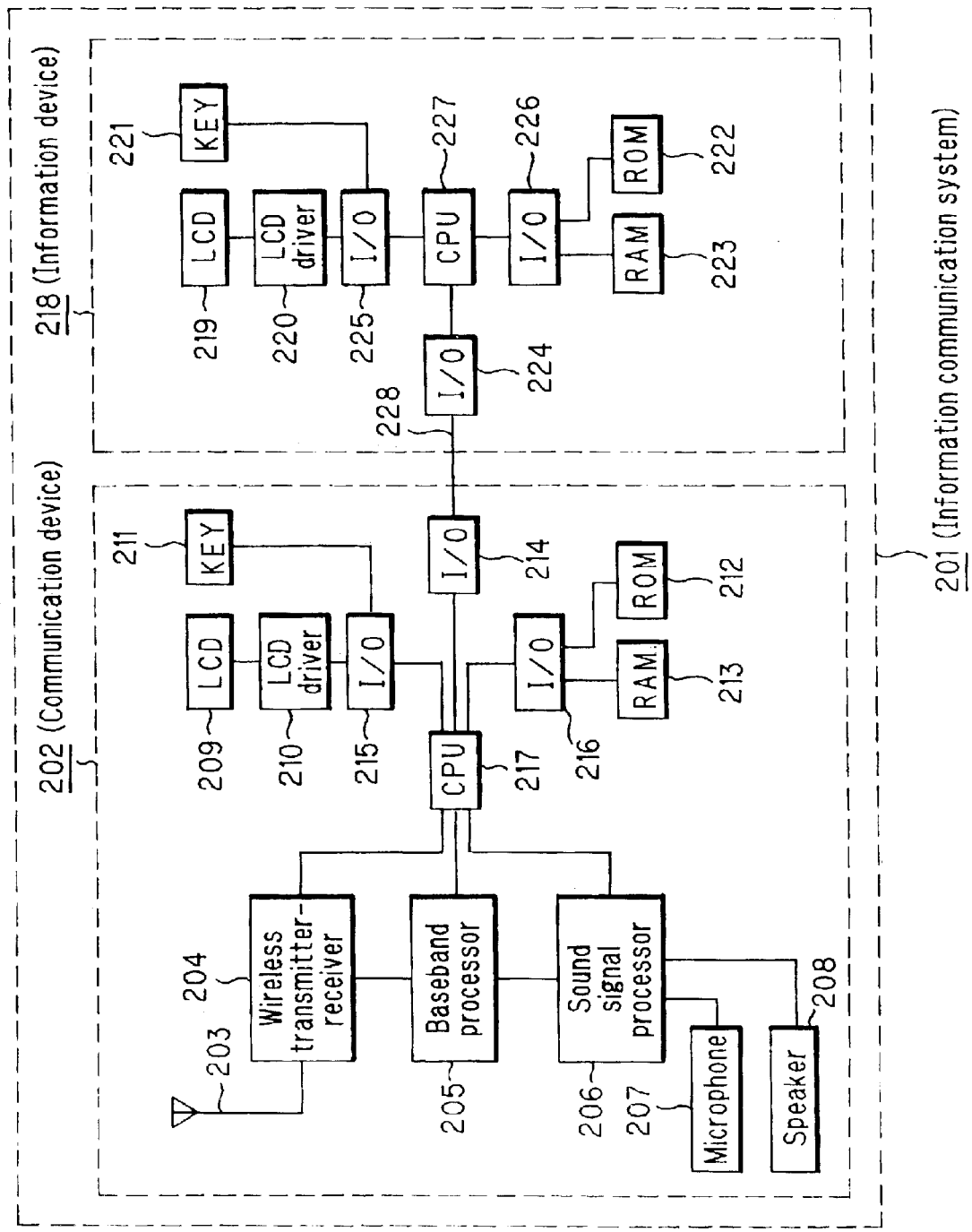
FIG. 2 is a block diagram showing a configuration of a communication device and an information device portion constituting an information communication system in accordance with the embodiment.

FIG. 2 is a block diagram showing the outline structure of control and processing in information communication system 201 according to the embodiment. This system includes the common components of the information communication system shown in FIG. 1 and other components than the system of FIG. 1. This information communication system 201 is comprised of a communication device 202, an information device 218 and a connecting means 228 for connecting these two devices. Specifically, communication device 202 includes: an antenna 203 and wireless transmitter-receiver 204 for sending and receiving data with data communication networks; a baseband signal processor 205 for encoding the signal to be sent and decoding the received signal and the like; a sound signal processor 206; a microphone 207 and speaker 208 connecting to the sound signal processor 206; a LCD (liquid crystal device) 209 for giving notice to the user and displaying information in text or pictorial representation on the screen; an LCD driver 210 for control the LCD 209; a KEY pad 211 through which the user may give instructions to communication device 202 and enter text, etc.; a ROM 212 for storing programs for performing location registration, calling and other communication control; a RAM 213 for providing the working area and data storage for performing the above programs; an I/O device 214 for connection to information device 218; and a CPU 217 connected to the aforementioned various devices via I/O devices 215 and 216 for executing the programs stored in ROM 212 and making control of other devices.

Information device 218 includes: a large LCD 219 for displaying various notice and information for the user; an LCD driver 220 for making control of the LCD 219; a KEY pad 221, PIM and the like, through which the user may give instructions to the communication device and enter text, etc.; a ROM 222 for storing programs such as application programs; a RAM 223 for providing the working area and data storage for performing the above programs; an I/O device 224 for connection to communication device 202; and a CPU 227 connected to the aforementioned various devices via I/O device 225 and 226 for executing the programs stored in ROM 222 and making control of other devices.

Even if communication device 202 and information device 218 are separated, these two components are kept so as to be electrically connected, i.e., either wire-connected or wirelessly connected between the aforesaid I/O devices 214 and 224 by connecting means 228.

Figure 3:
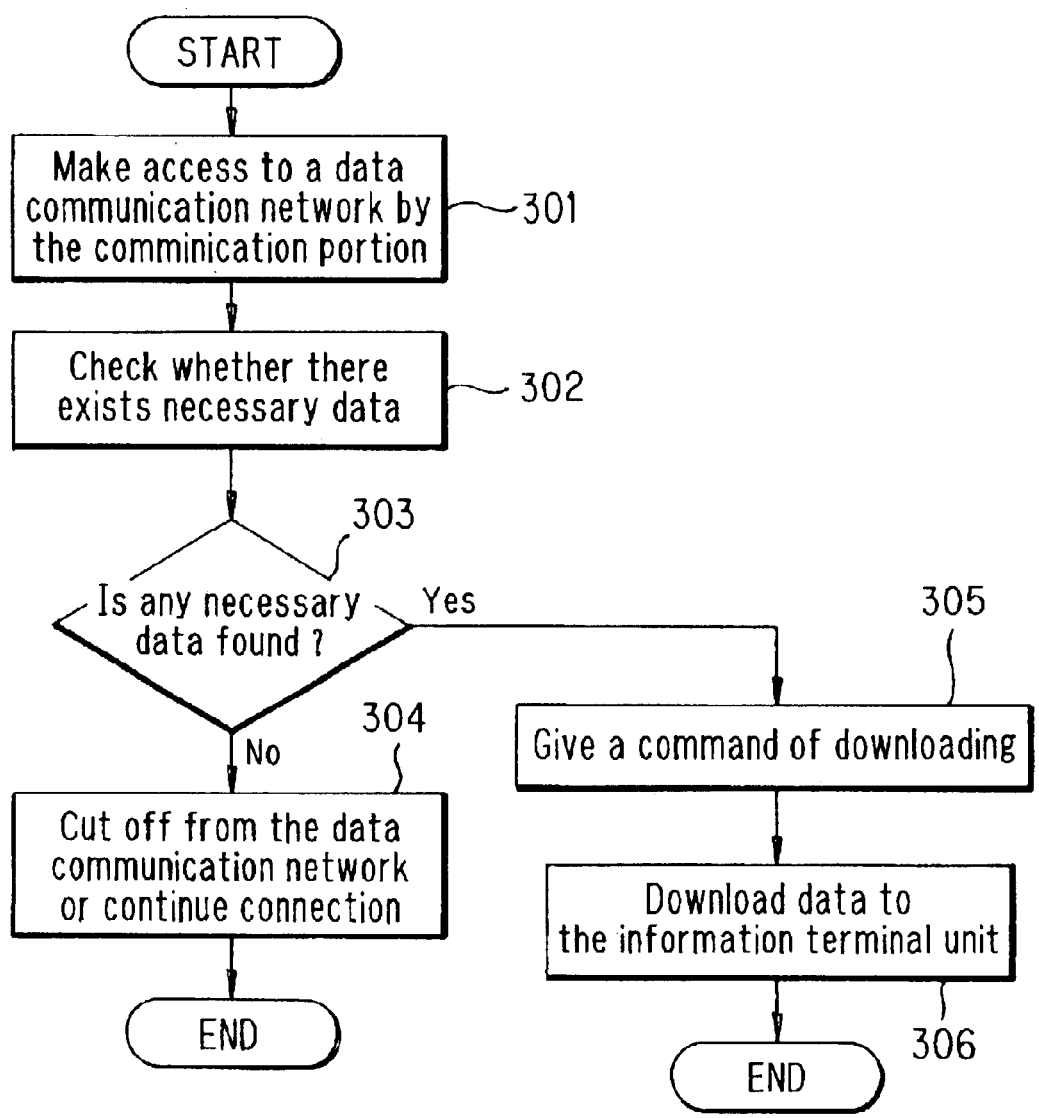
FIG. 3 is a flowchart showing a processing sequence when the information communication system of the present embodiment is connected to a data communication network.

FIG. 3 is a flowchart showing the sequence of processing for downloading data from a data communication network, in the information communication system of the present embodiment, the process including steps 301 through 306.

First, in order to obtain easy access to the data communication network, the user may connect the system to the data communication network with communication device 101 (Step 301) of FIG. 1. Titles and summary of content information on the communication network are displayed on display screen 102 of communication device 101, and the user checks whether there are necessary pieces of data (Step 302). When the user finds a necessary piece of data (Step 303: Yes), the user gives a command for downloading the data through control portion 103 (Step 305) so as to start the downloading of the data to the information device (Step 306). If the user cannot find any necessary pieces of data (Step 303: No), the user continues checking whether there are necessary pieces of data or cuts the system off the data communication network (Step 304).

Figure 4:
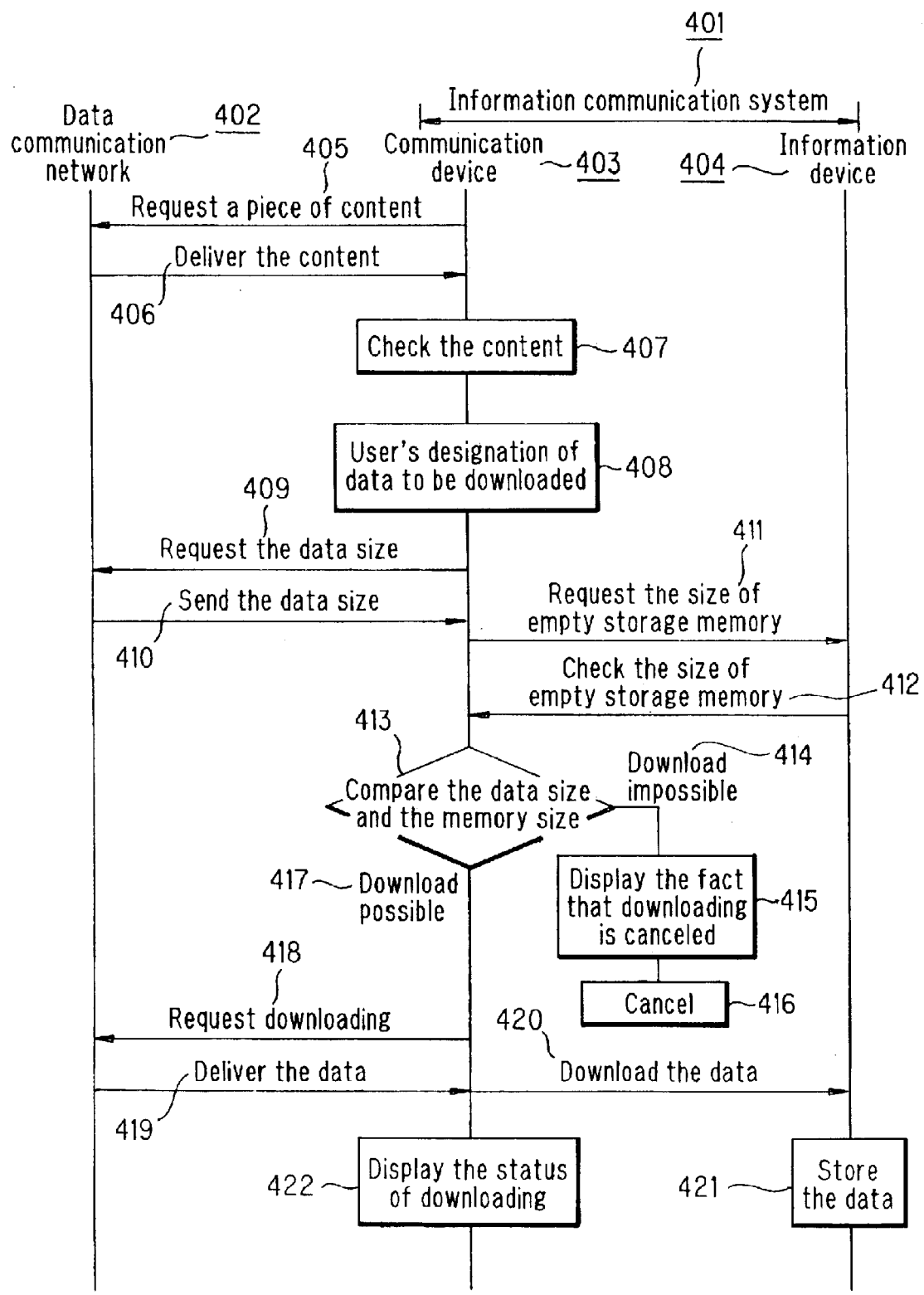
FIG. 4 is a flowchart showing specific information transfer and processing sequence with regards to the communication device and information device when the information communication system of the present embodiment is connected to a data communication network.

FIG. 4 shows the details of processing and exchange of messages and data when some data is downloaded from a data communication network 402 by an information communication system 401 (communication device 403 and information device 404) in accordance with the present embodiment. Information communication system 401 may employ the information communication system shown in FIG. 1 or 2. FIG. 4 is a flowchart showing data transfer and the operational sequence of the process including the steps designated by Step 405 to Step 422.

When information communication system 401 of the present embodiment makes access to the data communication network 402, communication device 403 makes a request for data communication network 402 to provide the content (Step 405). As receiving the request, data communication network 402 starts delivery of the content to communication device 403 or downloading of the content starts at communication device 403 (Step 406). The user, who is engaged in operating communication device 403, views the downloaded content and checks whether there are necessary pieces of data (Step 407). When the user has found a necessary piece of data, the user sends a command of downloading the necessary data to communication device 403 (Step 408). Communication device 403, having received the command of downloading the data from the user, requests a report of the data size of the data to be downloaded, to data communication network 402 (Step 409). The data communication network 402, having received the request for the data size, sends the information of the data size of the data to communication device 403 (Step 410).

Next, communication device 403 requests a report of the size of empty storage memory in information device 404 (Step 411). Information device 404, having received the request for the report of the size of empty storage memory, checks the size of its empty storage memory and reports the size of empty storage memory to communication device 403 (Step 412).

Figure 5:
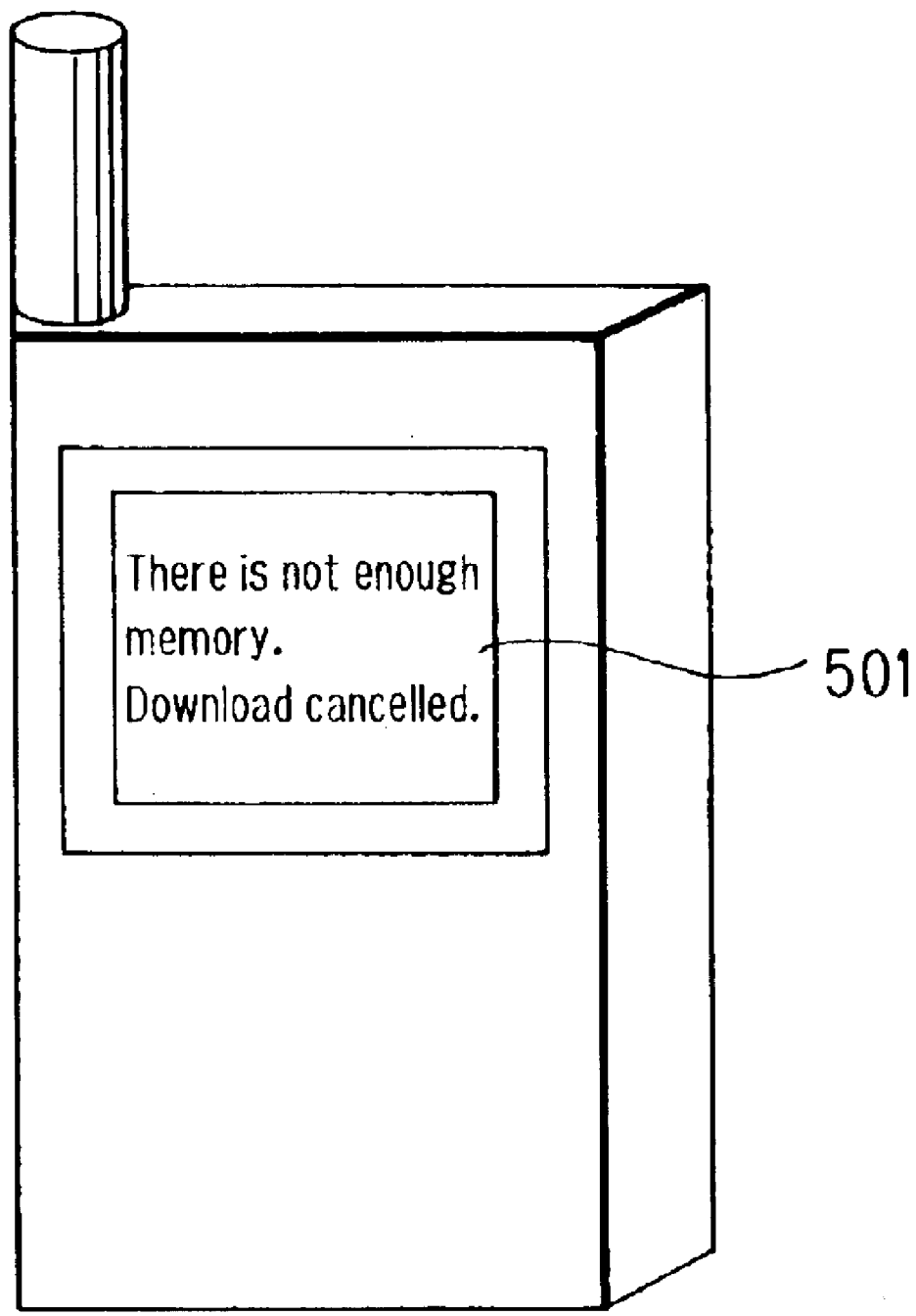
FIG. 5 is a perspective view showing an example of display screen in a communication device of an information communication system of the present embodiment.

Communication device 403, having received the size of data and the size of empty storage memory, checks whether the size of empty storage memory is large enough to download the data (Step 413). As a result of comparison, if it is determined that the size of empty storage memory is not large enough and the downloading is impossible or difficult (Step 414), communication device 403 stops downloading (Step 416) while displaying the fact of the cancellation of downloading on a display screen 501 thereof (the same is done for display screen 102 in FIG. 1 or LCD 209 in FIG. 2) (Step 415), as shown in FIG. 5. When it is determined that the size of empty storage memory is large enough and the downloading is possible (Step 417), communication device 403 sends a request for downloading the data to data communication network 402 (Step 418). Data communication network 402, having received the data downloading request 417, starts delivery of the data to communication device 403 (Step 419).

Communication device 403, having received delivery of data, transfers the downloaded data to information device 404 (Step 420). Information device 404, having received delivery of data, stores the received data into its storage memory (Step 421). At the same time, communication device 403 displays the downloading status of data on the display screen thereof (Step 422).

Here, it is possible to configure the system so that the data communication network distributes the data size of each piece of data contained in the content at the same time as it distributes the content (Step 406), so that communication device 403 does not need to make any data size request onto the data communication network 402 when the device is instructed by the user to download the data (Step 408).

FIG. 6 shows an information communication system 601, connected to a data communication network 602, for illustrating the details of processing and exchange of messages and data when the content is viewed. Here, communication device 603 and information device 604 are configured in the same manner as the communication devices and information devices in FIGS. 1 and 2, and these devices are either wire-connected or wirelessly connected to each other by some connecting means.

FIG. 6 is a flowchart showing the sequence of data transfer including the steps designated by Step 605 to Step 612.

When communication device 603 makes access to data communication network 602, communication device 603 makes a request for data communication network 602 to provide the content (Step 605). On receiving the request, data communication network 602 starts delivery of the content to communication device 603 (Step 606). If the content is represented as their information summary (or small data for cellular phones, etc.), communication device 603 having received the content displays it on the display screen thereof. The user views the content from the display and if the user needs detailed information, the user gives the command to communication device 603 (Step 608). Communication device 603, having received the order of data delivery from the user, sends a request for delivery of the designated content to data communication network 602 (Step 609). The data communication network 602, having received the request, delivers the designated content to communication device 603 (Step 610). When the designated content received by communication device 603 is in the form of detailed information (or large data including images etc.), communication device 603 transfers the content to information device 604 (Step 611). Information device 604, having received the content, displays the content on the display screen thereof (Step 612).

Thus, while the distributed content is given in the form of detailed information (or large data including images etc.), information device 604 is used to perform display and serve as user interface. When the distributed content is given in the form of information summary (or small data for cellular phones etc.), communication device 603 is used to perform display and serve as the user interface.

In the above, determination as to whether the distributed content is in the form of summary information or in the form of detailed information can be made by various methods, such as that based on a piece of information (tag) assigned when the content is delivered or based on the size of data up to completion of delivery of the content. It is also possible to determine the content being received as detailed information when its size exceeds a fixed threshold level.

FIG. 7 shows an information communication system 701 of an embodiment, connected to a data communication network 702, for illustrating the details of processing and exchange of messages and data when the content is viewed. Here, communication device 703 and information device 704 are configured in the same manner as the communication devices and information devices in FIGS. 1 and 2, and these devices are either wire-connected or wirelessly connected to each other by some connecting means. FIG. 7 is a flowchart showing the sequence of data transfer including the steps designated by Step 705 to Step 714.

When communication device 703 makes access to the data communication network 702, communication device 703 makes a request for data communication network 702 to offer the content (Step 705). On receiving the request, data communication network 702 starts delivery of the content (or its summary) to communication device 703 (Step 706). If the content is represented as their information summary (or small data for cellular phones, etc.), communication device 703 having received the content displays the data on the screen thereof. The user views the details of the content from the display and if the user needs detailed information, the user gives the command to communication device 703 (Step 708). Communication device 703, having received the order of data delivery from the user, sends a request of delivery of the designated content to data communication network 702 (Step 709). The data communication network 702, having received the request, sends the designated content to communication device 703 (Step 710). When the received content is in the form of detailed information (or large data including images etc.), communication device 703 transfers the content to information device 704 (Step 711). At the same time, text data and the like are extracted from the designated content (Step 712) so that the text data and the like are displayed on the display screen of communication device 703 (Step 713). The information device 704 having received the content, stores that content into the storage memory of information device 704 (Step 714).

Thus, while the distributed content is given in the form of detailed information (or large data including images etc.), text data is extracted at communication device 703 so as to be displayed on the display screen on communication device 703 and at the same time, the data of the content is transferred to information device 704 so as to be stored therein. When the distributed content is given in the form of information summary (or small data for cellular phones etc.), communication device 703 is used to perform display. In either case, control is performed through communication device 703.

As has been described heretofore, according to the information communication system of the example embodiment of the present invention, since selection of data to be downloaded is made through the compact communication device while the data is stored into the information terminal unit, it is possible to avoid time and labor of taking out the large information device from a bag or the like and using the information device to perform re-access to or of making the information device access when it is unknown whether there actually exits data to be downloaded.

Further, since the status of downloading data is displayed on the display screen of the communication device, it is possible to check the progress status of the download.

Since the volume of data to be downloaded is checked beforehand, it is possible to avoid failure of download due to shortage of the storage memory capacity, hence no waste telecommunication charge will occur.

Further, when information is reviewed, information that can be displayed on a small display portion is displayed on the display screen of the communication device while only the detailed information including images etc., is displayed on the display screen on the information device. This arrangement makes it possible to avoid time and labor of using the information device to perform re-access to get the view of the detailed information or of making the information device access when it is unknown whether detailed information is needed or not.

Further, when detailed information is reviewed, only the content that can be displayed on a small display portion is extracted so as to be displayed on the communication device while the full information is stored into the information device. Thus, it is possible for the user to select their favorite information and leisurely review the details of the selected information that has been stored in the information device, at a later time.

INDUSTRIAL APPLICABILITY

As has been described, the information communication system according to the present invention is preferably applied to a configuration comprised of a compact communication device which enables retrieval of desired information in a simple and easy manner and an information device which enables proper storage and display of the obtained desired information. More specifically, the system is effectively applied to a configuration including: a compact communication device which enables proper access to a data network such as the Internet or the like and easy processing of small-sized data such as reading of information summary and designation for downloading; and an information device which facilitates data processing of large-sized data such as reading of details of data and storage of the downloaded data.

What is claimed is:

1. An information communication system comprising:
   a communication device including a communication unit for connection to a communication network, a small display screen and a control portion;
   an information device including a large display screen, a storage memory and a control portion; and
   a connecting means for enabling data exchange between the communication device and the information device, wherein the connecting means provides an electrical connection between the communication device and the information device, enables data exchange between them and enables the information device to send request information to the data communication network via the communication device; the communication device enables content data and/or summary of information to be checked on the display screen thereof when content data and/or information is downloaded via the communication network, and the data body of the content and/or detailed information of which download is wanted is downloaded to the information device utilizing the connecting means so that the data and/or the information is stored in the storage memory of the information device and displayed on the display screen thereof; and a piece of content information is designated through the communication device, and while the content information is downloaded to the information device, the content information is displayed on the display screen of the information device at the same time as the content information is downloaded to the information device.

2. The information communication system according to claim 1, wherein based on the information included in the downloaded information, it is determined whether the information should be displayed on the display screen of the communication device or should be displayed on the display screen of the information device.

3. The information communication system according to claim 1, wherein it is determined whether the received information should be displayed on the display screen of the communication device or should be displayed on the display screen of the information device based on the size of the received information.

4. The information communication system according to claim 1, wherein, when the size of information being downloaded to the information terminal exceeds a predetermined level, the information is determined to be displayed on the information device.

5. An information communication system comprising:
   a communication device including a communication unit for connection to a communication network, a small display screen and a control portion;
   an information device including a large display screen, a storage memory and a control portion; and
   a connecting means for enabling data exchange between the communication device and the information device, wherein the connecting means provides an electrical connection between the communication device and the information device, enables data exchange between them and enables the information device to send request information to the data communication network via the communication device; the communication device enables content data and/or summary of information to be checked on the display screen thereof when content data and/or information is downloaded via the communication network, and the data body of the content and/or detailed information of which download is wanted is downloaded to the information device utilizing the connecting means so that the data and/or the information is stored in the storage memory of the information device and displayed on the display screen of the information device; and a piece of content information is designated through the communication device and the downloading is requested by the communication device, and when the data is downloaded to the information device using the connecting means, only the data displayable on the display screen of the communication device is extracted from the downloaded content information so as to be displayed on the display screen on the communication device while the whole data is downloaded to the information device and stored into the storage memory in the information device.

6. An information system comprising:
   a communication terminal including a communication section for connecting to a communication network, a display screen of a first size and a control section;
   an information terminal including a display screen of a second size larger than the first size, a storage section and a control section; and
   a communication link between the communication terminal and the information terminal,
   wherein, in response to a first request, the communication terminal receives summary information transmitted over the communication network and displays the received summary information on the display screen thereof,
   wherein, in response to a second request generated based on the displayed summary information, the communication terminal receives detailed information transmitted over the communication network and sends the detailed information to the information terminal over the communication link, and
   wherein the information terminal receives the detailed information sent from the communication terminal and the control section of the information terminal performs one or both of a storing operation for storing the detailed information in the storage section of the information terminal and a display operation for displaying the detailed information on the display screen of the information terminal.

7. The communication system according to claim 6, wherein the communication link comprises a wired communication link.

8. The communication system according to claim 6, wherein the communication link comprises a wireless communication link.

9. The communication system according to claim 6, wherein the control section of the communication terminal selectively extracts one or more portions of the detailed information and controls the display screen of the communication terminal to display the extracted portions.

10. The communication system according to claim 9, wherein the extracted portions comprise text portions of the detailed information.

11. The communication system according to claim 6,
wherein the summary information is transmitted with a summary information tag and the detailed information is transmitted with a detailed information tag, and
wherein the control section of the communication terminal identifies the summary information and the detailed information based on the summary information tag and the detailed information tag.

12. The communication system according to claim 6, wherein the control section of the communication terminal identifies the summary information and the detailed information based on an information size threshold.

13. The communication system according to claim 6,
wherein the control section of the communication terminal sends an available storage request over the communication link to the information terminal and, in response to the available storage request, the control section of the information terminal determines the amount of storage available in the storage section and sends the determined amount to the control section of the communication terminal, and
wherein the communication terminal sends the detailed information to the information terminal only if the amount of the detailed information is less than the amount of available storage.

14. The communication system according to claim 13, wherein the control section of the communication terminal controls the display screen of the communication terminal to display indicia if the amount of detailed information exceeds the amount of available storage.

15. The communication system according to claim 6, wherein the control section of the communication terminal causes the display screen thereof to display status information while the detailed information is sent to the information terminal over the communication link.

16. An information system comprising:
a communication terminal including a communication section for connecting to a communication network, a display screen and a control section;
an information terminal including a display screen, a storage section and a control section; and
a communication link between the communication terminal and the information terminal,
wherein the information terminal is itself not connectable to any communication network except via the communication terminal,
wherein, in response to a first request, the communication terminal receives first information transmitted over the communication network, displays the received first information on the display screen thereof, but does not send the first information to the information terminal,
wherein, in response to a second request generated based on the displayed first information, the communication terminal receives second information transmitted over the communication network and sends the second information to the information terminal over the communication link, and
wherein the information terminal receives the second information sent from the communication terminal and the control section of the information terminal performs one or both of a storing operation for storing the second information in the storage section of the information terminal and a display operation for displaying the second information on the display screen of the information terminal.

17. The information system according to claim 16, wherein the first information comprises summary information and the second information comprises detailed information.

18. The information system according to claim 16, wherein the first and second information is identified via tags respectively associated therewith.

19. The information system according to claim 16, the sending of the second information to the information terminal over the communication link is conditioned upon availability of sufficient storage in the storage section of the information terminal for storing all of the second information.

20. The information system according to claim 16, wherein the control section of the communication terminal selectively extracts one or more portions of the second information and controls the display screen of the communication terminal to display the extracted portions.

* * * * *